D. P. COLLINS.
SPEED CHANGING AND TRANSMISSION GEARING.
APPLICATION FILED MAY 31, 1911.
1,033,084.
Patented July 23, 1912.
3 SHEETS—SHEET 1.
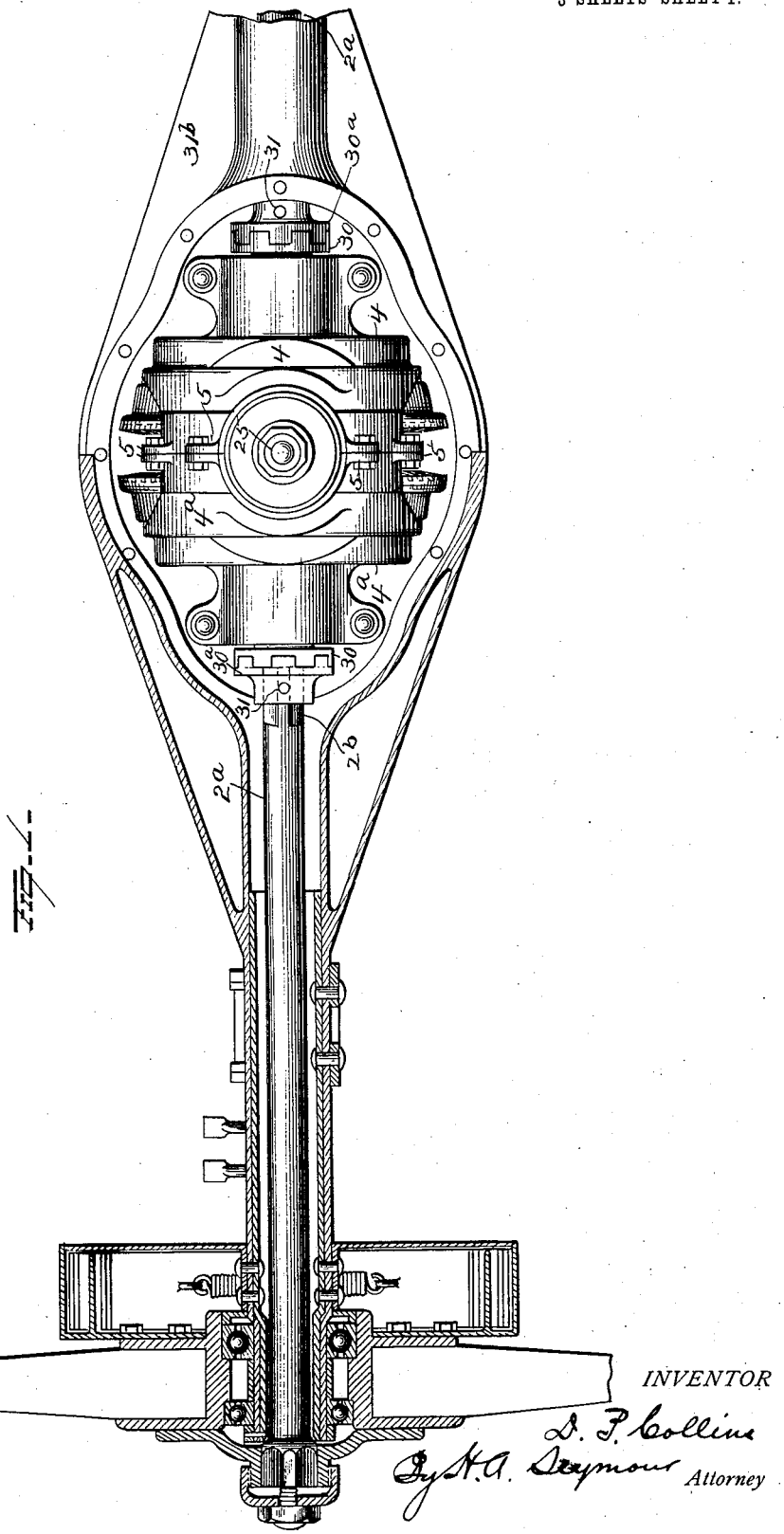

D. P. COLLINS.
SPEED CHANGING AND TRANSMISSION GEARING.
APPLICATION FILED MAY 31, 1911.
1,033,084.
Patented July 23, 1912.
3 SHEETS—SHEET 2.
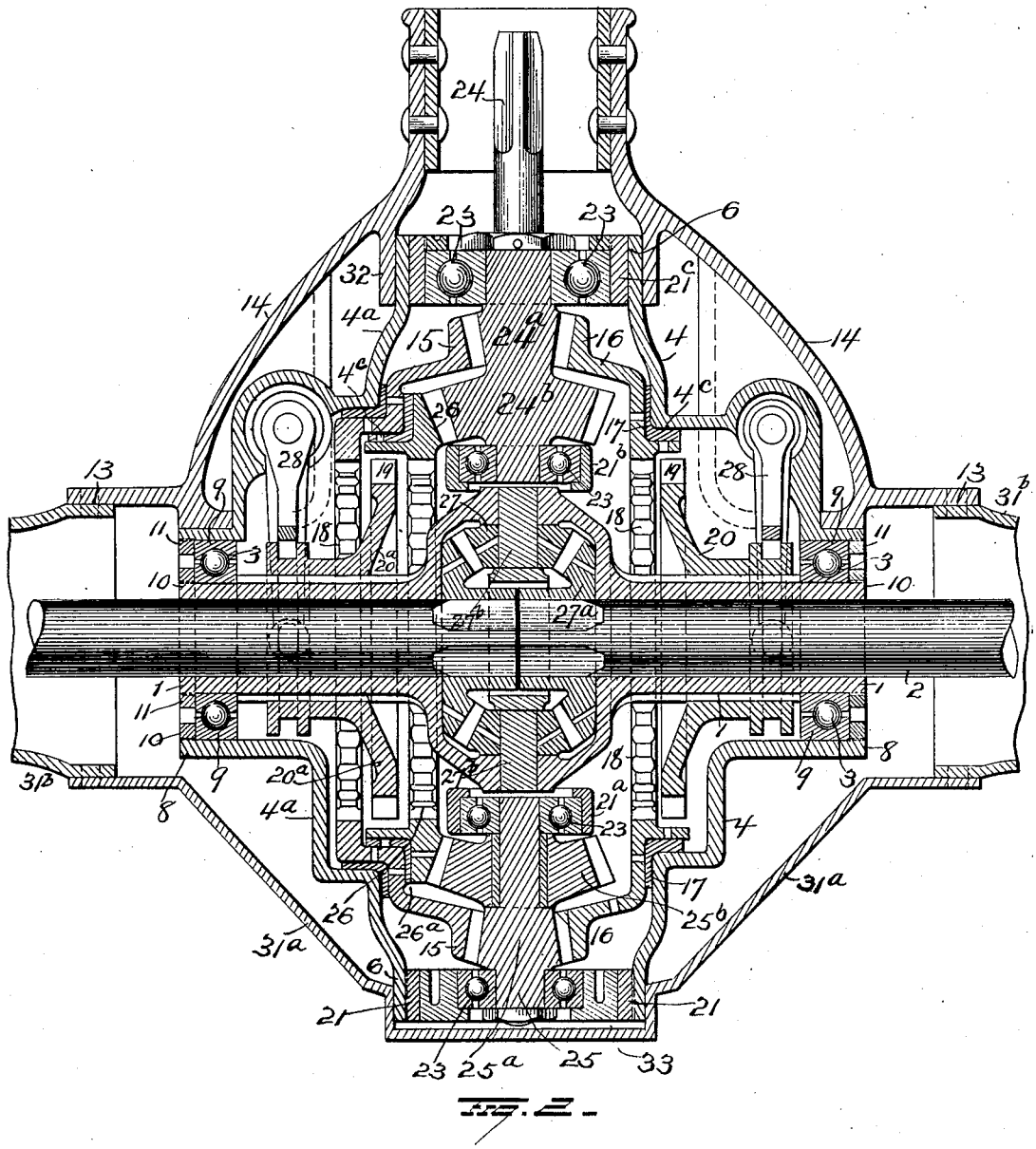
WITNESSES
INVENTOR

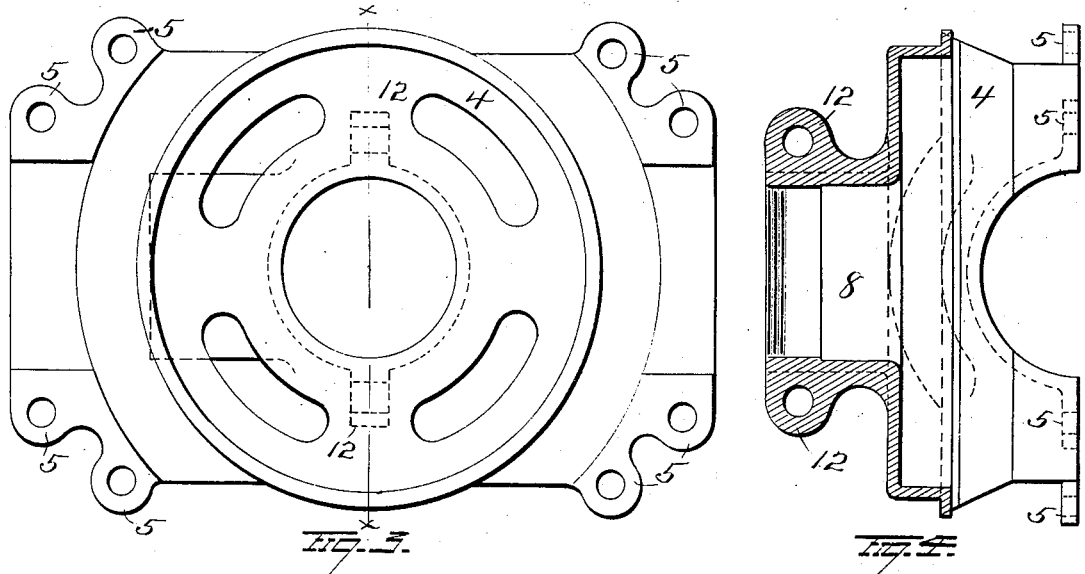
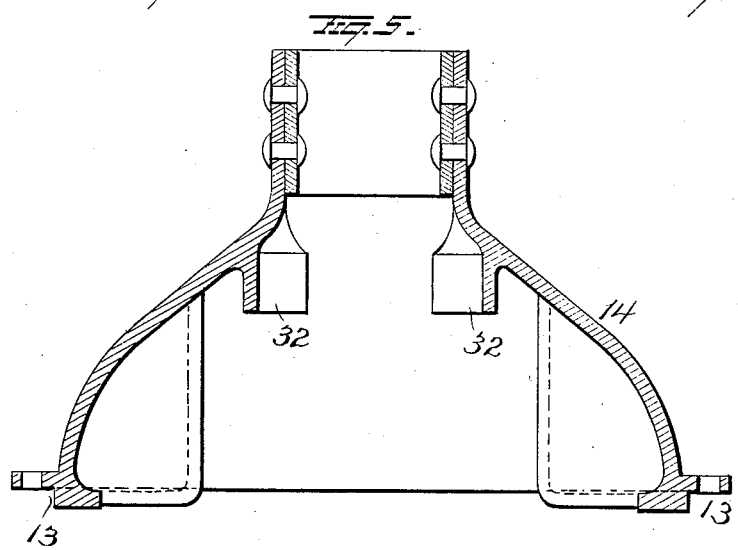
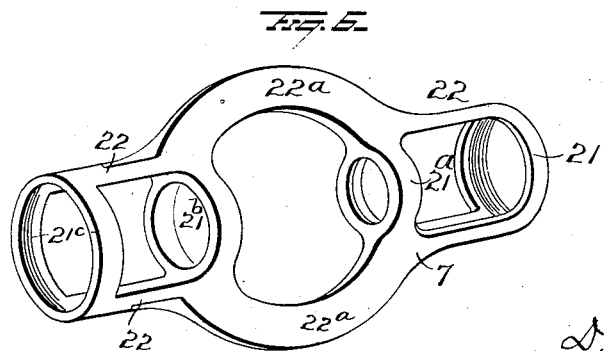

UNITED STATES PATENT OFFICE.

DENNIS P. COLLINS, OF PITTSBURGH, PENNSYLVANIA, ASSIGNOR TO COLLINS AXLE MANUFACTURING COMPANY, OF PITTSBURGH, PENNSYLVANIA.

SPEED-CHANGING AND TRANSMISSION GEARING.

1,033,084. Specification of Letters Patent. Patented July 23, 1912.

Application filed May 31, 1911. Serial No. 630,495.

*To all whom it may concern:*

Be it known that I, DENNIS P. COLLINS, of Pittsburgh, in the county of Allegheny and State of Pennsylvania, have invented certain new and useful Improvements in Speed-Changing and Transmission Gearing; and I do hereby declare the following to be a full, clear, and exact description of the invention, such as will enable others skilled in the art to which it appertains to make and use the same.

My invention relates to an improvement in speed changing and transmission gearing, and more particularly to improvements on the construction disclosed in my pending application No. 618,478 filed April 1st, 1911, the object of the present invention being to provide means whereby the entire gearing may be assembled and adjusted, and inserted bodily into the housing and be removed therefrom, without withdrawing or otherwise moving the rear axle sections.

A further object is to provide improved means for assembling and mounting the drive pinions, independently of the gears.

With these and other objects in view, my invention consists in the parts and combinations of parts as will be more fully described and pointed out in the claims.

In the accompanying drawings, Figure 1 is a view partly in section and partly in elevation of the gear and axle housing, the gear casing being shown in rear elevation; Fig. 2 is a view in horizontal section through the gear casing and gears; Fig. 3 is a view in side elevation of one section of the gear casing; Fig. 4 is a section on the line $x$ $x$ of Fig. 3; Fig. 5 is a view in section of the gear case carrier and housing and Fig. 6 is a perspective view of the cage for the pinion ball bearing.

1 represents the rear axle sleeve covering and embracing the inner ends of two sections 2 of the rear axle. This sleeve 1 is mounted at its ends in the ball bearings 3 carried by the two part cast metal casing and frame 4 and $4^a$. This combined casing and frame forms the housing and support for the gears, and is divided longitudinally in line with the drive shaft, as shown in Fig. 1, and are secured together by bolts passing through ears 5 integral with the sections 4 and $4^a$, suitable shims being interposed between the meeting edges of the two sections of the casing, if necessary to secure the proper adjustment of the gearing and pinions. Each section 4 and $4^a$ of the gear case is provided at each end with a semi-cylindrical bearing 6 for the reception of the cylindrical ends of the ball bearing cage 7, and each is provided centrally at its side with a cylindrical bearing 8 for the rings 9 carrying the ball bearing 3, the said rings being held in place by the bearing adjusting ring 10 and the nut 11. Each section 4 and $4^a$ of the gear casing, is also provided approximately midway its length, with the perforated ears 12, which latter rest in contact with the seats 13 formed on the rear edge of the front section 14 of the housing, which latter carries the gear casing. Each section 4 and $4^a$ of the casing is provided with an annular cylindrical bearing $4^c$, which carry respectively the slow speed and reverse gears 15 and 16, a bronze bushing 17 being interposed between each wheel hub and its bearing, and preferably secured to the gear. The gear hubs, as shown in Fig. 2, are open at their centers, and are provided with inwardly projecting teeth 18 which are adapted to be engaged by the teeth 19 of the clutch members 20 and $20^a$ mounted to slide on the sleeve 1, but keyed to the latter.

7 is a ball bearing cage, which comprises four rings or bearings 21—$21^a$—$21^b$—$21^c$, connected by integral yokes 22—$22^a$ the latter being curved as shown so as to embrace the enlarged center of the sleeve 1. The end bearings 21 and $21^c$, of this cage rests within the cylindrical bearings 6 at the rear and front ends of the gear casing 4—$4^a$, as shown in Fig. 2, and together with the intermediate rings or bearings $21^a$ and $21^b$ carrying the ball bearings 23 in which the main and secondary drive shafts are mounted. Main drive shaft 24 is provided with a pinion $24^a$ meshing with slow speed gear 15 and the reverse gear 16, and with a larger pinion $24^b$, meshing with the high speed gear 26, both pinions being fixed to or integral with the shaft, which latter is designed to be detachably coupled up to the section of the drive shaft (not shown) leading from the engine.

Secondary drive shaft 25 is provided with two pinions $25^a$ and $25^b$, the former of which is fixed to the shaft 25 and meshes with the slow speed gear 15 and the reverse gear 16, and the larger pinion $25^b$ meshes with the high speed gear, 26. Pinion 25$^b$ may be either fast or loose on shaft 25. When either fast or loose it supports and sustains the fast speed gear and holds it to its seat, and when fast, it assists main drive pinion 24$^b$ in driving, through the slow speed gear, pinion 25$^a$ and secondary drive shaft 25.

Mounted within the hub of the slow speed gear 15, is the high speed transmission gear 26, a suitable bronze or other bushing 26$^a$ being interposed between the gears as shown and preferably secured to one of them. The hub of this high speed gear is also provided with clutch teeth adapted to be engaged by the teeth of movable clutch member 20$^c$, the latter being located in a position to engage either hub, or rest in a neutral position between both without engaging either.

The rear axle sleeve 1 is enlarged at its center, as shown in Fig. 2, to receive the differential gears 27 and 27$^a$, the former of which are mounted on the shafts 27$^b$, carried by the sleeve 1, and the latter secured respectively to the abutting ends of the two sections 2 of the rear axle, and operate in the usual and well known manner. The hubs of clutch members 20 and 20$^a$ are keyed to sleeve 1, so as to impart rotary motion thereto, the clutch member 20$^a$ being adapted to lock either the high or low speed gears to the sleeve 1, and the clutch member 20 adapted to lock the reverse gear to the sleeve. The clutches are provided with shifting means, 28, both of which are preferably actuated by a single lever, but which may be operated by any approved means.

The drive pinion 24$^a$ on main drive shaft meshes with the slow speed and reverse gears and rotates both, but as only one can be clutched to the sleeve at a time, motion from the drive shaft will be imparted to the sleeve, and from the latter to the rear axle section through the gear that is clutched to the sleeve. Drive pinion 24$^b$ meshes with the high speed gear and drives same. As previously explained, clutch member 20$^a$, is designed to connect both high and low speed gears to the sleeve, but not both at the same time, and when in the position shown in Fig. 2, both gears are disconnected from the sleeve.

As shown in Fig. 1 each axle section 2 is provided at its outer end with a fixed coupling member 30 having teeth adapted to interlock with similar teeth on the movable coupling member 30$^a$. Each movable member of the coupling is mounted to slide on the angular ends 2$^b$ of the outer section 2$^a$ of the axle, and is secured in place by the tapered pins 31 driven through the sleeve of the movable member of the coupling and through the axle sections 2$^a$. By removing the pins, and sliding the movable sections of the couplings outwardly so as to disconnect the outer sections 2$^a$ of the axles from the inner sections 2, the entire gearing including the axle section 2, will be free to be withdrawn without disturbing the outer sections 2$^a$ of the axles. By this construction the drive wheels of the vehicle may be keyed or otherwise fixed to the axles 2$^a$, thus permitting all the gearing to be removed without disturbing the drive wheels or the axle sections connected to the latter. The casing and rear axle are covered by a pressed steel housing 31$^b$ having an opening at the rear, closed by a cap 31$^a$. The front section of this housing is provided with an inwardly projecting bearing 32 to receive and support the front cylindrical end of the gear casing 4 and 4$^a$ while the removable cap has a cylindrical seat 33 to receive and support the rear end of said casing, so that when the parts are assembled, the gear casing will be supported at its front and rear ends, and is detachably secured intermediate its ends to the front section of the housing by bolts as before explained. The main and secondary drive shafts with their pinions thereon are assembled in the cage 7 and the sleeve with its clutch members, axle sections and differential gearing and the forward drive and reverse gears are then assembled and inclosed within the casing 4—4$^a$, and after the parts have been properly adjusted, the casing with the parts therein is passed through the rear opening in the housing and coupled up to the main section of the drive shaft and to the axle sections 2$^a$, and the casing secured to the housing 31$^b$. This housing 31$^b$ also covers and conceals the axles and carries the spring seats, in the usual and well known manner.

With this construction the low speed gear is mounted in an annular bearing in one section of the casing, while the reverse speed gear is mounted in a similar bearing in the other section of the casing, while the high speed gear is mounted in and carried by the hub of the low speed gear. This casing also carries the bearings for the axle sleeve and supports the ends of the cage, so that the entire mechanism is supported in the casing which as shown in Fig. 1 may be open at the top and bottom so as to permit the gears to project, thus decreasing the height of the housing.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. In apparatus of the class described, the combination with a housing, a drive shaft, an axle or shaft to be driven, a pinion on the drive shaft, a casing inclosing said pinion and made up of two sections, a forward drive gear mounted in a bearing in one section of the casing, a reverse gear mounted in a bearing on the other section of the casing, the said drive and reverse gears meshing with said pinion on the drive shaft, and means for connecting the gears to the driven shaft or axle, the whole of said casing with its inclosed gears and pinions being removable from the housing.

2. In apparatus of the class described, the combination with a housing, a drive shaft, an axle or shaft to be driven, pinions on the drive shaft, a two part casing inclosing said pinions, high and low speed transmission gears in one section of the casing the low speed gear having its bearing formed on one section of the casing, and a reverse gear mounted in a bearing on the other section of the casing, the said low speed drive and reverse gears meshing with one pinion on the drive shaft, and the high speed drive gear with the other pinion on the drive shaft, the whole of said casing and its inclosing gearing being removable from the housing.

3. In apparatus of the class described, a drive shaft, an axle or shaft to be driven, a pair of pinions of different size connected with the drive shaft, a casing divided longitudinally into two sections, high, low and reverse speed gears mounted in said casing, the low speed and reverse gears meshing with one pinion on the drive shaft and the high speed gear meshing with the other pinion, and clutch members slidably mounted on the driven shaft and engaging the gears which are of annular form, the whole of said gear casing with the gears, clutches, pinions and driving shaft being removable bodily.

4. In combination in apparatus of the class described, a drive shaft, a driven shaft or axle, a pair of pinions on the drive shaft, a casing made up of two sections divided in the direction of length of the drive shaft, a gear having its bearing in one section of the casing and meshing with one of said pinions, a gear meshing with the other pinion, said last mentioned gear having bearing within the hub of the first mentioned gear and means for connecting either gear with the driven shaft or axle.

5. In combination in apparatus of the class described, a two part casing divided in the direction of length of the drive shaft, a cage within said casing, main and secondary drive shafts mounted in the cage, pinions on said shafts, gears within the casing outside of the cage and meshing with the pinions on the drive shafts, a driven shaft or axle and means for connecting either gear with the driven shaft or axle.

6. In combination in apparatus of the class described, a drive shaft, a driven shaft or axle composed of two members, differential gearing at the meeting ends of the two members, a casing for said differential gearing surrounding the shaft sections, pinions connected with the drive shaft, annular gears meshing therewith and on each side of the differential gearing, clutch means between the differential casing and said gears, and a gear casing made up of two parts divided in the direction of the length of the drive shaft, said gears, differential casing and drive shaft being supported by and movable with the two part casing.

7. In combination in apparatus of the class described, a drive shaft, a driven shaft or axle, change speed gearing between the drive and driven shafts, a two part casing embracing and supporting said gearing and a housing having a removable cap, said casing with its gearing being removable through the opening covered by said removable cap.

8. In combination in apparatus of the class described, a drive shaft, a driven shaft or axle, gearing between same, a housing, a two part casing detachably secured to and within said housing and inclosing the gearing, and a cage supported by the housing and having bearings for the drive shaft, the said casing and its contained parts being removable as a whole through an opening in the housing.

9. In combination in apparatus of the class described, a drive shaft, a driven shaft or axle, a two part casing, a cage within and supported by said casing and carrying the bearings for the drive shaft, a housing in which the casing is secured, the said housing having an opening through which the casing is inserted and removed, gearing within the casing and at the sides of the cage for connecting the driving and driven shaft or axle and means for connecting either gear with the driven shaft or axle.

10. In combination a drive shaft, a two part driven shaft, differential gearing connecting the two parts of the said driven shaft, a casing for the differential gearing, a cage embracing the casing for the differential gearing and carrying the drive shaft, drive pinion on said shaft, a main casing carrying said cage, gearing within said main casing and meshing with the drive pinions, and a housing within which the main casing is secured, the said housing having an opening through which the main casing and its contained parts may be inserted and withdrawn.

11. The combination of an axle composed of two outer and two inner sections, differential gearing connecting the two inner sections, couplings connecting the outer ends of the two inner sections to the outer sections of the axle, a drive shaft, gearing connecting said drive shaft and the two inner sections of the axle, a casing carrying said drive shaft, gearing and two inner sections of the axle, and a housing to which said casing is removably secured, the said housing having an opening for the passage of the casing and its contained parts.

12. The combination of a two part axle, differential gearing connecting same, a cage embracing the differential gearing, main and supplemental drive shafts mounted in said cage, a drive pinion on each drive shaft, a casing inclosing all of said parts, gears within the casing and meshing with the pinions on the drive shafts, and a housing in which the casing is detachably secured, the said housing having an opening for the insertion and removal of the casing and its contained parts.

In testimony whereof, I have signed this specification in the presence of two subscribing witnesses.

DENNIS P. COLLINS.

Witnesses:
E. L. KELLY,
ROY NYE.